(12) United States Patent
Liu et al.

(10) Patent No.: US 12,066,943 B1
(45) Date of Patent: Aug. 20, 2024

(54) ALIAS PROCESSING METHOD AND SYSTEM BASED ON L1D-L2 CACHES AND RELATED DEVICE

(71) Applicant: RIVAI TECHNOLOGIES (SHENZHEN) CO., LTD., Shenzhen (CN)

(72) Inventors: Muyang Liu, Shenzhen (CN); Rong Chen, Shenzhen (CN); Zhilei Yang, Shenzhen (CN)

(73) Assignee: Rivai Technologies (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 18/689,068

(22) PCT Filed: Nov. 20, 2023

(86) PCT No.: PCT/CN2023/132629
§ 371 (c)(1),
(2) Date: Mar. 4, 2024

(30) Foreign Application Priority Data

Jun. 15, 2023 (CN) .......................... 202310707262.0

(51) Int. Cl.
*G06F 12/08* (2016.01)
*G06F 12/0811* (2016.01)

(52) U.S. Cl.
CPC ................. *G06F 12/0811* (2013.01)

(58) Field of Classification Search
CPC .................................................. G06F 12/0811
See application file for complete search history.

(56) References Cited

U.S. PATENT DOCUMENTS

| | | | |
|---|---|---|---|
| 5,623,627 A | 4/1997 | Witt | |
| 9,934,152 B1 | 4/2018 | Bryant | |
| 2003/0204680 A1 | 10/2003 | James, Jr. | |
| 2003/0217229 A1* | 11/2003 | Rowlands | ........... G06F 12/0817 711/129 |
| 2008/0072004 A1 | 3/2008 | Kershaw | |
| 2015/0309930 A1 | 10/2015 | Olorode | |
| 2016/0321773 A1 | 11/2016 | Bolz | |
| 2021/0365374 A1 | 11/2021 | Chachad | |

FOREIGN PATENT DOCUMENTS

| | | |
|---|---|---|
| CN | 101794259 A | 8/2010 |
| CN | 103309940 A | 9/2013 |
| CN | 112612727 A | 4/2021 |

OTHER PUBLICATIONS

Yao Yong Bin, Superscalar Risc Processor Design, Apr. 1, 2014, Tsinghua University Press, China.
Search Report from CN Application No. 2023107072620, dated Jul. 18, 2023, 4 pages.

\* cited by examiner

*Primary Examiner* — Jae U Yu
(74) *Attorney, Agent, or Firm* — Daylight Law, P.C.

(57) ABSTRACT

The present disclosure is suitable for the field of hardware chip design, and particularly relates to an alias processing method and system based on L1D-L2 caches and a related device. A method for solving an alias problem of the L1D cache based on a L1D cache-L2 cache structure and a corresponding system module are disclosed. The method provided by the present disclosure can maximize hardware resource efficiency, without limiting a chip structure, a hardware system type, an operating system compatibility and a chip performance, and meanwhile, the module realized based on the cache cannot greatly increase power consumption of the whole system, thus having good expandability.

10 Claims, 5 Drawing Sheets

ALIAS PROCESSING METHOD AND SYSTEM BASED ON L1D-L2 CACHES AND RELATED DEVICE

CROSS-REFERENCE TO RELATED APPLICATIONS

This application is a national stage filing under 35 U.S.C. § 371 of international application number PCT/CN2023/132629, filed Nov. 20, 2023, which claims priority to Chinese patent application No. 202310707262.0 filed Jun. 15, 2023. The contents of these applications are incorporated herein by reference in their entirety.

TECHNICAL FIELD

The present disclosure is suitable for the field of hardware chip design, and particularly relates to an alias processing method and system based on L1D-L2 caches and a related device.

BACKGROUND

With the increasing demand for a performance of a processor chip in industry, the processor chip is applied in many scenarios, and as one of the most important modules that affect a performance of a modern computer system, a multi-level cache technology has been widely discussed and studied.

Figure 1:
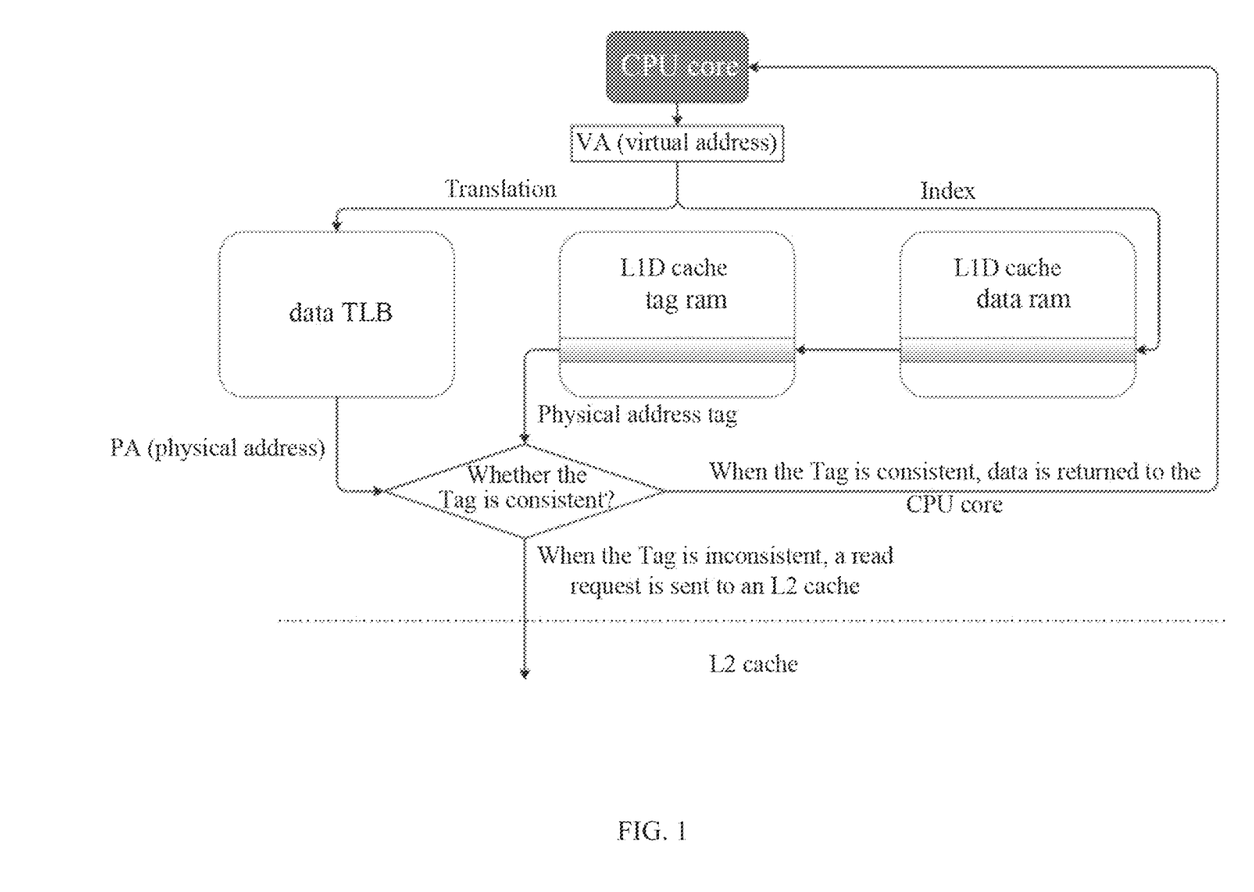
FIG. 1 is a flow diagram of a virtual index physical tag in a L1D cache.

A modern multi-level cache sub-system mostly includes three-level caches (i.e., first level (L1), second level (L2) and third level (L3)), where the L1 cache further includes a first-level data (L1D) cache and a first-level instruction (L1I) cache. The modern L1D cache is mostly designed as a VIPT (virtual index physical tag) type, which facilitates a virtual address sent by a CPU core to access a Translation Lookaside Buffer (TLB) and the L1D cache in parallel to improve the performance, without the ambiguity problem, as shown in FIG. 1. In addition, the L1D cache usually executes write allocation and write back strategies, which means that a write request from the CPU core will be allocated to the L1D cache, and is written back to a main memory only when being evicted or ordered to write back.

Figure 2:
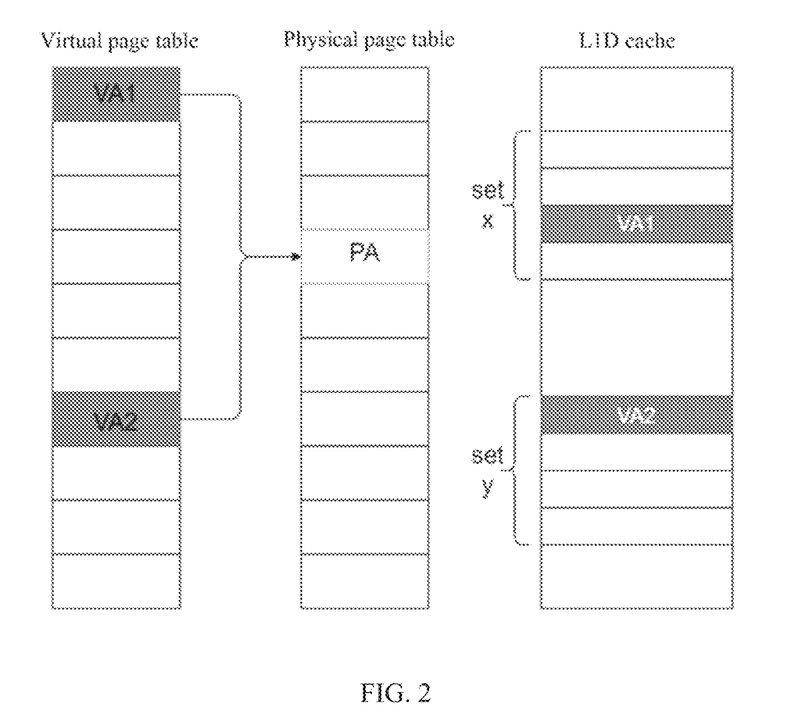
FIG. 2 is a schematic diagram of the virtual index physical tag.
Figure 3:
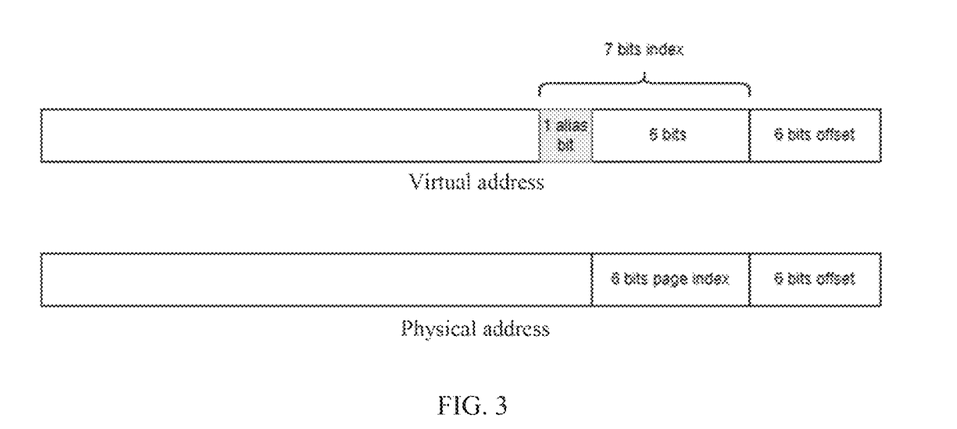
FIG. 3 is a schematic diagram of allocation of a virtual address and a physical address.

However, this method of using the virtual index physical tag may have the risk of cache alias problem, the cache alias is caused by multiple virtual addresses mapped to the same physical address but cached in different cache lines, as shown in FIG. 2. For example, if virtual addresses VA1 and VA2 mapped to the same physical address are initially refilled to a set x and a set y (data sets) of the L1D cache respectively, data Dx is written in through the VA1 in a process A at the moment, then data Dy is written in through the VA2 in a process B, and then the data of the VA1 is read in the process A according to a program execution order. At the moment, process A is supposed to read the data Dy (the VA1 and the VA2 correspond to the same physical address), but it reads the data Dx because this read request is determined to be hit in the set x in the L1D cache, resulting in a consistency error. If the L1D cache is designed to have a size of 32 KB and 4 associated paths of sets, with a total of 128 sets, a 7-bit VA is needed for indexing, while a physical page index is only 6 bits, as shown in FIG. 3, so that the virtual addresses supposed to be indexed to the same set are indexed to different sets.

There are four methods to solve the cache alias problem in the existing technology:

I. The problem is solved by modifying a size or a set association degree of the L1D cache to ensure that a number of bits of the virtual index physical tag is less than or equal to a number of bits of a physical index physical tag, but this method greatly restricts a hardware architecture, which greatly reduces a storage size of the cache, thus greatly reducing the performance of the processor chip.

II. In an aspect of software, alias bits of the virtual addresses are forced to remain the same by page coloring and other technologies through an operating system. That is, the virtual addresses must be mapped into the same data set cached, however this method can increase a burden of design of the operating system and reduce a compatibility of the processor chip with the operating system;

III. In an aspect of hardware, by a method of adding banks to the VIPT cache, the banks are divided according to the alias bits, and cache lines in two banks are written at the same time when a write operation occurs (Yongbin YAO, Superscalar Processor Design, Tsinghua University Press, 2014), but this method can reduce a storage capacity of the cache, increase a bandwidth pressure of a write request, and improve power consumption of a cache module. Meanwhile, this solution is not expandable, which means that a number of banks is increased exponentially with the increase of alias bits.

IV. In the aspect of hardware, by using a directory of a downstream cache, an alias bit corresponding to a cache line of a L1D cache is recorded in a directory of a L2 cache to detect the alias problem. When a read request from the same physical address is detected and is inconsistent with the alias bit in the directory (that is, the alias problem occurs), data corresponding to the physical address saved in the L1D cache is forced to be evicted and data corresponding to a new virtual address is refilled at the moment, and meanwhile the alias bit recorded in the directory of the L2 cache is changed. However, this method needs to design the cache sub-system as a directory-based type, which is not suitable for a snoop-based cache sub-system.

To sum up, the method for solving the alias problem in the existing technology has limitations in hardware architecture, cache sub-system type and expandability.

SUMMARY

The present disclosure provides an alias processing method and system based on L1D-L2 caches and a related device, aiming at solving the problem of limitation in hardware architecture, cache sub-system type and expandability when dealing with an alias problem in the existing technology.

In accordance with a first aspect of the present disclosure, an alias processing method based on L1D-L2 caches is provided, the alias processing method includes the following steps of:

establishing a tag copy random access memory used for copying a tag random access memory in the L1D cache, where the tag random access memory and the tag copy random access memory are both composed of a plurality of data sets;

establishing a valid array, and marking a data validity of each data set in the tag copy random access memory with the valid array;

acquiring a check request sent by the L1D cache, where the check request is sent in response to the L1D cache requests data from the L2 cache;

checking in the tag copy random access memory based on the valid array, and determining whether the check request hits the data set in the tag copy random access memory, in response to the check request hits the data set;

invalidating the check request in the L2 cache, and saving the check request; and sending a flush request with a physical address corresponding to the check request to the L1D cache, where the flush request is used for deleting a data set corresponding to the physical address in the L1D cache.

Further, the data sets in the tag random access memory are associated into N paths, and the data sets in the tag copy random access memory are associated into 2N paths.

Further, after the step of invalidating the check request in the L2 cache, and saving the check request, the alias processing method further includes the step of:

receiving a cache line of the corresponding physical address sent by the L1D cache, and releasing the check request to the L2 cache.

Further, the alias processing method further includes the following steps of:

acquiring a fill request sent by the L1D cache, where the fill request is sent in response to the L1D cache fills data to the L2 cache; and based on the fill request, writing a data set with the same physical address as that of the fill request in the tag copy random access memory, and updating the valid array to mark a validity of the data set in the tag copy random access memory.

Further, after the step of invalidating the check request in the L2 cache, and saving the check request, the alias processing method further includes the step of:

marking the data set corresponding to the physical address as invalid in the valid array.

In accordance with a second aspect of the present disclosure, an alias processing system based on L1D-L2 caches is provided, the alias processing system includes:

a tag copy module configured to establish a tag copy random access memory, wherein the tag copy random access memory is used for copying a tag random access memory in the L1D cache, where the tag random access memory and the tag copy random access memory are both composed of a plurality of data sets;

a valid array module configured to establish a valid array, and marking a data validity of each data set in the tag copy random access memory with the valid array;

a refill prestation module configured to acquire a check request sent by the L1D cache, where the check request is sent in response to the L1D cache requests data from the L2 cache; and a control unit module configured to check in the tag copy random access memory based on the valid array, and determine whether the check request hits the data set in the tag copy random access memory, in response to the check request hits the data set, the control unit module is configured to:

invalidate the check request in the L2 cache, and saving the check request; and send a flush request with a physical address corresponding to the check request to the LID cache, where the flush request is used for deleting a data set corresponding to the check request in the L1D cache.

Further, the control unit module is also configured to:

receive a cache line of the corresponding physical address sent by the L1D cache, and releasing the check request to the L2 cache.

Further, the control unit module is also configured to:

acquire a fill request sent by the L1D cache, where the fill request is sent in response to the L1D cache fills data to the L2 cache; and based on the fill request, write a data set with the same physical address as that of the fill request in the tag copy random access memory, and update the valid array to mark a validity of the data set in the tag copy random access memory.

In accordance with a third aspect of the present disclosure, a computer device is provided, which includes a memory, a processor and an alias processing program based on L1D-L2 caches which is stored on the memory and executable on the processor, where the processor implements the steps in the alias processing method based on the L1D-L2 caches according to any one of the above embodiments when executing the alias processing program based on the L1D-L2 caches.

In accordance with a fourth aspect of the present disclosure, a computer-readable storage medium is provided, the computer-readable storage medium stores an alias processing program based on L1D-L2 caches, and the steps in the alias processing method based on the L1D-L2 caches according to any one of the above embodiments are implemented when the processor executes the alias processing program based on the L1D-L2 caches.

The present disclosure achieves the beneficial effects that the method for solving an alias problem of the L1D cache based on a L1D cache-L2 cache structure and a corresponding system module are provided, the method provided by the present disclosure can maximize hardware resource efficiency, without limiting a chip structure, a hardware system type, an operating system compatibility and a chip performance, and meanwhile, the module realized based on the cache does not greatly increase power consumption of the whole system, thus having good expandability.

DETAILED DESCRIPTION

To make the objects, technical solutions, and advantages of the present disclosure clearer, the present disclosure is further described in detail hereinafter with reference to the drawings and embodiments. It should be understood that specific embodiments described herein are only used for explaining the present disclosure and are not intended to limit the present disclosure.

Figure 4:
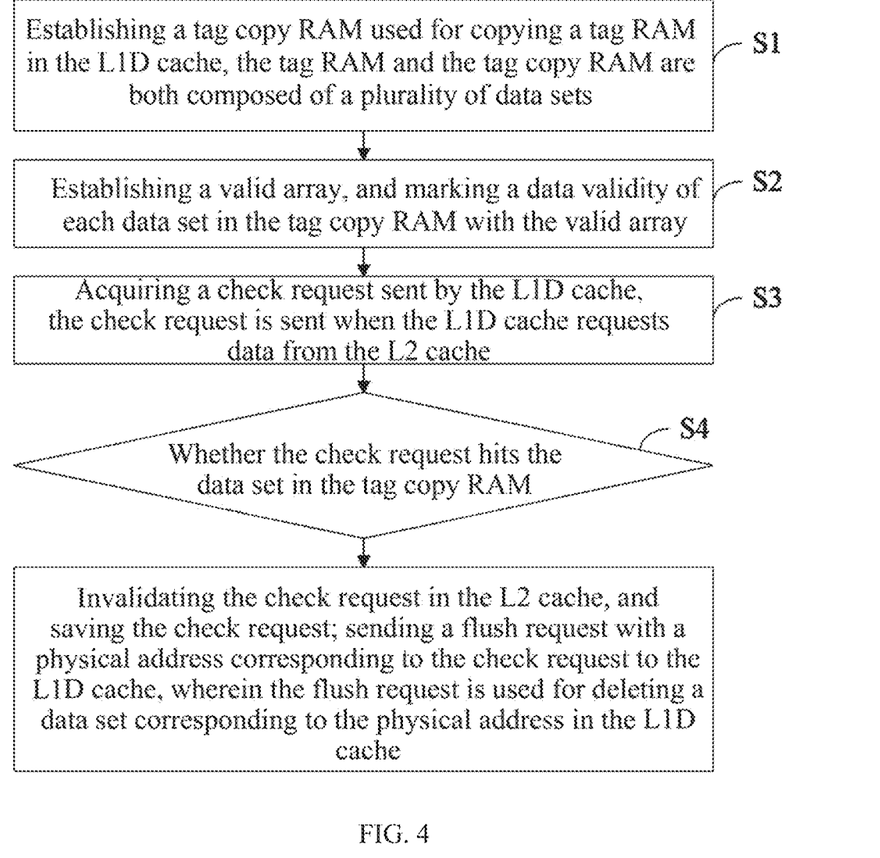
FIG. 4 is a flow block diagram of steps of an alias processing method based on L1D-L2 caches provided by an embodiment of the present disclosure.

With reference to FIG. 4, FIG. 4 is a flow block diagram of steps of an alias processing method based on L1D-L2 caches provided by an embodiment of the present disclosure, and the alias processing method includes the following steps.

In S1, a tag copy random access memory is established, where the tag copy random access memory is used for copying a tag random access memory in the L1D cache, and the tag random access memory and the tag copy random access memory are both composed of a plurality of data sets.

Figure 5:
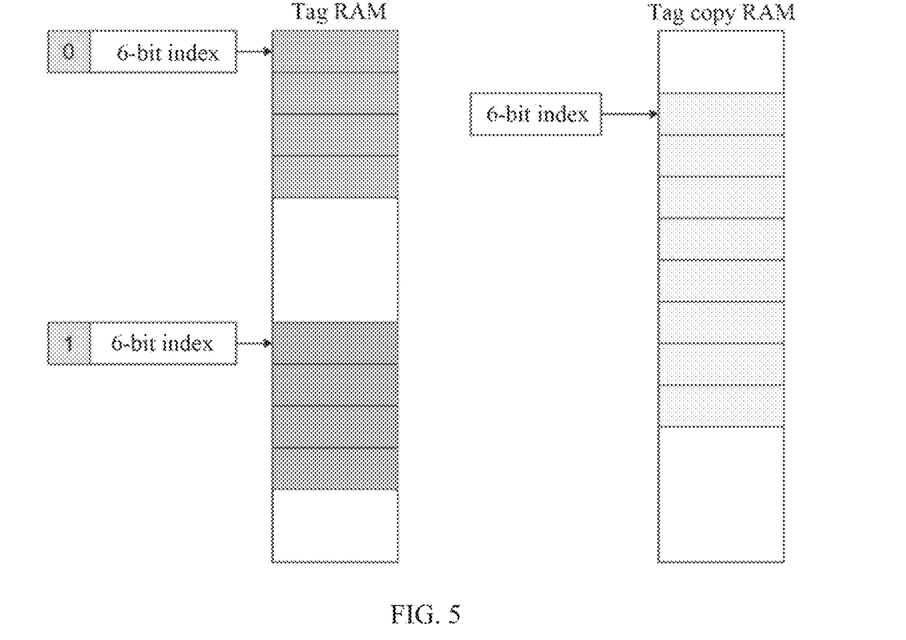
FIG. 5 is a schematic diagram of structural comparison between a tag random access memory in L1D and a tag copy random access memory provided by the embodiment of the present disclosure.

Specifically, the tag copy random access memory (tag copy RAM) is independently established and maintained in the L2 cache, and the embodiment of the present disclosure realizes detection and processing of an alias problem based on the tag copy random access memory. Further, the data sets in the tag random access memory are associated into N paths, and the data sets in the tag copy random access memory are associated into 2N paths. Illustratively, the tag copy random access memory can be obtained by copying the tag random access memory (tag RAM) in the L1D cache, with a difference that a number of associated paths of the data sets needs to be modified during establishment. As shown in FIG. 5, the tag random access memory is 4 paths of data sets associated, while the tag copy random access memory is 8 paths of data sets associated. More specifically, the tag copy random access memory is a PIPT (physical index physical tag) type. In addition, unless otherwise specified, the alias processing method based on the L1D-L2 caches in the embodiment of the present disclosure is implemented based on a system environment in which the L1D cache and the L2 cache are strictly mutually exclusive, the L1D cache and the L2 cache can store completely different data in this environment, and this design method is intended to maximize a utilization rate of the cache.

In S2, a valid array is established, and a data validity of each data set in the tag copy random access memory is marked with the valid array.

The valid data is consistent with the array in the L1D cache for marking the data validity. The valid array is used for quickly screening out the data set with the valid data when a read request is obtained in the cache, thus increasing a speed of data processing.

In S3, a check request sent by the L1D cache is acquired, where the check request is sent when the L1D cache requests data from the L2 cache.

The read request sent from the L1D cache to the L2 cache can be regarded as the check request for reading data of the corresponding physical address through the L2 cache, which is caused by a multi-level design of the cache, and when the read request from the L1D cache does not hit the data of the L1D cache itself, the read request will be further sent to the L2 cache, that is to say, whether the alias problem is caused is determined after the L1D cache sends the check request.

In S4, a check is carried out in the tag copy random access memory based on the valid array, and whether the check request hits the data set in the tag copy random access memory is determined, when the check request hits the data set:
the check request is invalidated in the L2 cache, and the check request is saved; and a flush request with a physical address corresponding to the check request is sent to the L1D cache, where the flush request is used for deleting a data set containing the physical address in the L1D cache.

As for the detection of the alias problem, specifically, two virtual addresses with different alias bits can be mapped into different data sets in the L1D cache, and can be mapped into the same data set in the tag copy random access memory, and this is because the number of associated paths of the data sets in the tag copy random access memory in the embodiment of the present disclosure is twice that in the tag random access memory in the L1D cache. In an index of the physical address corresponding to the virtual address, because the two have the same number of bits but the tag copy random access memory has a larger index range, a request that is determined to be missed due to the alias problem in the L1D cache will be determined to be hit in the tag copy random access memory in the embodiment of the present disclosure, and the alias problem is detected at the moment.

Illustratively, a read request with a virtual index physical tag of 0x1d accesses the L1D cache for the first time, an alias bit of the read request is 0 at the moment, the L1D cache generates a compulsory miss, and a check request is sent to the L2 cache. When the L2 cache returns data to the L1D cache from the downstream for refilling, a tag corresponding to the data is refilled to a data set 29 of the tag random access memory, and meanwhile, the tag copy random access memory can also receive a signal and refill a corresponding copy tag to a copied data set 29. Subsequently, a read request with a virtual index physical tag of 0x5d accesses the L1D cache, an alias bit of the read request is 1 at the moment, the L1D cache generates the alias problem (physical index physical tags of lower six bits of the 0x1d and the 0x5d are the same), and the request is wrongly addressed to a data set 93, so that a non-true miss (the data of the same physical address already exists in the L1D cache) occurs, and the check request is sent to the L2 cache. At the moment, because an index of the tag copy random access memory in the embodiment of the present disclosure contains an address of the 0x5d, the request can be addressed to the copied data set 29 and hit the data set in the tag copy random access memory, thus realizing the detection of the alias problem.

As for the processing of the alias problem, specifically, when the alias problem is detected, the check request causing the alias problem can be terminated immediately, and meanwhile, a flush request of the same physical address is sent to the L1D cache. This step has two functions:

firstly, the check request causing the alias problem is terminated because the check request already exists in the L2 cache, after invalidating the check request, the execution of the request causing the alias problem can be temporarily stopped, and the alias processing method in the embodiment of the present disclosure is implemented based on an independent cache architecture, and after invalidating the check request, the check request can be saved based on the independent cache architecture, which is convenient for subsequent processing; and secondly, the flush request with the physical address is sent to the L1D cache, this is because the alias problem is already detected at the moment, which means that data sets with different alias bits but the same physical address already exist in the tag random access memory of the L1D cache, and in order to prevent the data sets from causing the alias problem again, the data sets containing the physical address in the L1D cache are deleted through the flush request.

In another aspect, because the step S4 is designed as a determining step for detecting the alias problem, when the check request fails to hit the data set in the tag copy random access memory, the alias problem will not be detected, which means that it is unnecessary to process the current check request.

Further, after the step of invalidating the check request in the L2 cache, the alias processing method further includes the step of:

receiving a cache line of the corresponding physical address sent by the L1D cache, and releasing the check request to the L2 cache.

This step is intended to continuously execute the original check request after dealing with the alias problem. From the point of view of program execution, although the check request generates the alias problem, the request is not illegal, so that the request needs to be executed normally. In the above step, the check request is saved based on the independent cache architecture in the embodiment of the present disclosure, and when the cache line corresponding to the physical address sent by the L1D cache is received again, it is indicated that data corresponding to the address of the check request is requested to be filled in the L1D cache. Further, the cache line sent by the L1D cache is intended to read data from the physical address, however a corresponding instruction is already saved independently. In order to improve processing efficiency, the corresponding check request can be directly released from saved requests to the L2 cache in the embodiment of the present disclosure, so that the request is executed again.

Further, the alias processing method further includes the following steps of:

acquiring a fill request sent by the L1D cache, where the fill request is sent when the LID cache fills data to the L2 cache; and based on the fill request, writing a data set with the same physical address as that of the fill request in the tag copy random access memory, and updating the valid array to mark a validity of the data set in the tag copy random access memory.

This step is intended to keep contents of the tag copy random access memory established and maintained in the embodiment of the present disclosure consistent with those of the L1D cache when the tag random access memory in the L1D cache is filled with new data.

Further, after the step of invalidating the check request in the L2 cache, the alias processing method further includes the step of:

marking the data set corresponding to the physical address as invalid in the valid array.

This step is intended to improve reading and writing efficiency during reading and writing through the tag copy random access memory. In the embodiment of the present disclosure, the valid array is used for marking a validity of the data set, and after the check request in the L2 cache is invalidated, data in the tag copy random access memory is also hit because of the data set with the alias problem in the L1D cache, so that the hit data set is marked as invalid through the valid array, thus improving check efficiency in subsequent data reading and writing.

The present disclosure achieves the beneficial effects that the method for solving an alias problem of the L1D cache based on a L1D cache-L2 cache structure and a corresponding system module are provided, the method provided by the present disclosure can maximize hardware resource efficiency, without limiting a chip structure, a hardware system type, an operating system compatibility and a chip performance, and meanwhile, the module realized based on the cache cannot greatly increase power consumption of the whole system, thus having good expandability.

Figure 6:
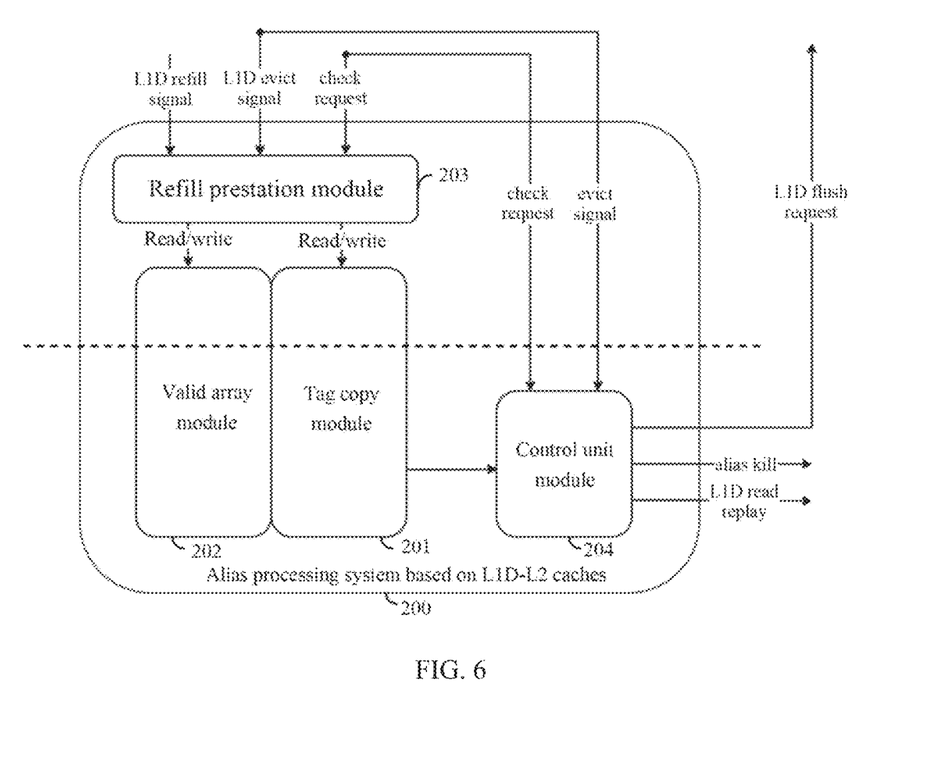
FIG. 6 is a schematic structural diagram of an alias processing system 200 based on LID-L2 caches provided by the embodiment of the present disclosure.

The embodiment of the present disclosure further provides an alias processing system based on L1D-L2 caches. With reference to FIG. 6, FIG. 6 is a schematic structural diagram of the alias processing system based on the L1D-L2 caches provided by the embodiment of the present disclosure, the alias processing system 200 based on the L1D-L2 caches is implemented by a two-stage flow line, which includes:

a tag copy module 201 configured to establish a tag copy random access memory, where the tag copy random access memory is configured to copy a tag random access memory in the L1D cache, and the tag random access memory and the tag copy random access memory are both composed of a plurality of data sets;

a valid array module 202 configured to establish a valid array, and marking a data validity of each data set in the tag copy random access memory with the valid array;

a refill prestation module 203 configured to acquire a check request sent by the L1D cache, where the check request is sent when the L1D cache requests data from the L2 cache; and a control unit module 204 configured to check in the tag copy random access memory based on the valid array, and determine whether the check request hits the data set in the tag copy random access memory, when the check request hits the data set:

the check request is invalidated in the L2 cache, and the check request is saved; and a flush request with a physical address corresponding to the check request is sent to the LID cache, where the flush request is used for deleting a data set containing the physical address in the L1D cache.

Further, the control unit module 204 is also configured to:

receive a cache line of the corresponding physical address sent by the L1D cache, and releasing the check request to the L2 cache;

acquire a fill request sent by the LID cache, where the fill request is sent when the LID cache fills data to the L2 cache; and based on the fill request, writing a data set with the same physical address as that of the fill request in the tag copy random access memory, and updating the valid array to mark a validity of the data set in the tag copy random access memory.

Specifically, based on the flow line design of the alias processing system 200 with the LID-L2 caches shown in FIG. 6, an input signal and an output signal of the system 200 can be divided into the following parts:

input signal: check request, which is sent from the L1D cache to the L2 cache: evict signal, which is a write request evicted from the L1D cache and sent to the L2 cache, and equivalent to the cache line; and refill signal, which is a signal sent by the L1D cache when data is refilled in the LID cache; and output signal: L1D flush request, which is sent to the L1D cache by the system 200 according to the embodiment of the present disclosure when the alias problem is detected: alias kill, which is an instruction invalidation signal sent to a flow line of the L2 cache by the system 200 in the embodiment of the present disclosure when the alias problem is detected; and L1D read replay, which is a signal sent by the system 200 in the embodiment of the present disclosure to the L2 cache when the corresponding cache line is flushed from the L1D cache to repeatedly execute the previously terminated check request.

Based on the input and output signals above, there are mainly four types of data flows in the alias processing system 200 based on the L1D-L2 caches provided in the embodiment of the present disclosure:

I. alias problem check data flow: the read request sent by the L1D cache to the L2 cache can be regarded as the check request, the request is loaded into the refill prestation module 203 at the same time to prepare for checking, the refill prestation module 203 sends the read signal to the valid array module 202 and the tag copy module 201, and the control unit module 204 compares the read tag and the data validity to determine whether the data is hit and generate a necessary signal;

II. alias processing system update data flow: after obtaining data returned from the L2 cache, the L1D cache sends the flush request to the alias processing system 200 while refilling the data to the corresponding RAM, the previous corresponding check request is already saved in the refill prestation module 203, and after receiving the refill signal, the refill prestation module 203 releases the corresponding request, and writes the corresponding request into the valid array module 202 and the tag copy module 201 at the same time to complete the update of the data set;

III. alias processing system invalidation data flow: the write request sent by the L1D cache to the L2 cache can be regarded as the invalidation signal, and an entry of the corresponding valid array module 202 will be invalidated; and IV. alias problem processing data flow: when the control unit module 204 detects the alias problem, the alias kill signal is immediately pulled up, the corresponding read request in the flow line of the L2 cache is terminated, the request is saved at the same time, and the flush signal is sent to the L1D cache to wait for the corresponding cache line of the same physical address to be evicted from the L1D cache; and when the control unit module 204 receives the evicted signal of the same address, the previously terminated read request is sent to the flow line of the L2 cache, and executed again.

The alias processing system 200 based on the L1D-L2 caches can implement the steps in the alias processing method based on the L1D-L2 caches in the above embodiment, and can achieve the same technical effect, referring to the description in the above embodiment, which will not be repeated herein.

Figure 7:
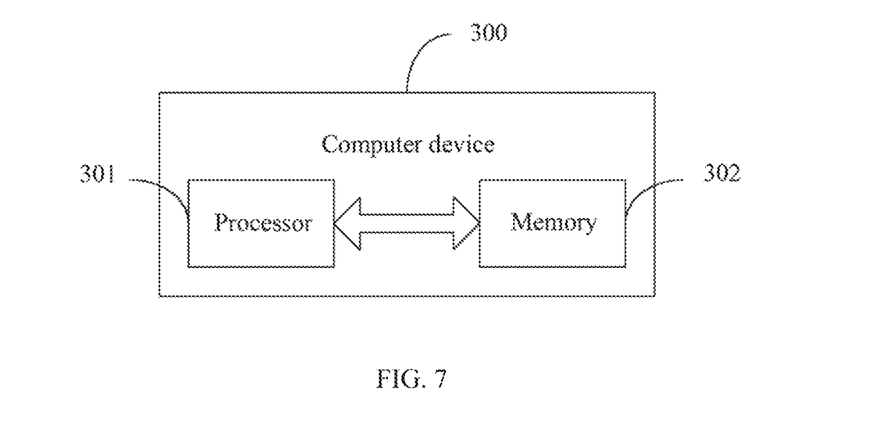
FIG. 7 is a schematic structural diagram of a computer device provided by the embodiment of the present disclosure.

The embodiment of the present disclosure further provides a computer device. With reference to FIG. 7, FIG. 7 is a schematic structural diagram of the computer device provided by the embodiment of the present disclosure. The computer device 300 includes a memory 302, a processor 301 and an alias processing program based on L1D-L2 caches which is stored on the memory 302 and executable on the processor 301.

The processor 301 calls the alias processing program based on the L1D-L2 caches which is stored on the memory 302, and executes the steps in the alias processing method based on the L1D-L2 caches provided in the embodiment of the present disclosure. With reference to FIG. 4, the method specifically includes the following steps of:

S1: establishing a tag copy random access memory used copying a tag random access memory in the L1D cache, where the tag random access memory and the tag copy random access memory are both composed of a plurality of data sets;

S2: establishing a valid array, and marking a data validity of each data set in the tag copy random access memory with the valid array;

S3: acquiring a check request sent by the L1D cache, where the check request is sent when the L1D cache requests data from the L2 cache; and S4: checking in the tag copy random access memory based on the valid array, and determining whether the check request hits the data set in the tag copy random access memory, when the check request hits the data set;

invalidating the check request in the L2 cache, and saving the check request; and sending a flush request with a physical address corresponding to the check request to the L1D cache, where the flush request is used for deleting a data set corresponding to the physical address in the L1D cache.

Further, after the step of invalidating the check request in the L2 cache, the alias processing method further includes the step of:

receiving a cache line of the corresponding physical address sent by the L1D cache, and releasing the check request to the L2 cache.

This step is intended to continuously execute the original check request after dealing with the alias problem.

Further, the alias processing method further includes the following steps of:

acquiring a fill request sent by the L1D cache, where the fill request is sent when the LID cache fills data to the L2 cache; and based on the fill request, writing a data set with the same physical address as that of the fill request in the tag copy random access memory, and updating the valid array to mark a validity of the data set in the tag copy random access memory.

This step is intended to keep contents of the tag copy random access memory established and maintained in the embodiment of the present disclosure consistent with those of the L1D cache when the tag random access memory in the L1D cache is filled with new data.

Further, after the step of invalidating the check request in the L2 cache, the alias processing method further includes the step of:

marking the data set corresponding to the physical address as invalid in the valid array.

This step is intended to improve reading and writing efficiency during reading and writing through the tag copy random access memory.

The computer device 300 provided in the embodiment of the present disclosure can implement the steps in the alias processing method based on the L1D-L2 caches in the above embodiment, and can achieve the same technical effect, referring to the description in the above embodiment, which will not be repeated herein.

The embodiment of the present disclosure further provides a computer-readable storage medium, where the computer-readable storage medium stores an alias processing program based on L1D-L2 caches, various procedures and steps in the alias processing method based on the L1D-L2 caches provided in the embodiment of the present disclosure are implemented when the processor executes the alias processing program based on the L1D-L2 caches, and the same technical effect can be achieved, referring to the description in the above embodiment, which will not be repeated herein.

Those of ordinary skills in the art can understand that all or partial flows in the method in the above embodiments can be completed by instructing related hardware through a computer program, the program can be stored in a computer-readable storage medium, and the program can include the flows in the above method embodiments when executed. The storage medium can be a magnetic disk, an optical disk, a Read-Only Memory (ROM), a Random Access Memory (RAM), or the like.

It should be noted that the terms "include", "include", or any variants thereof are intended to cover a non-exclusive inclusion herein. Therefore, a process, method, article, or apparatus that includes a series of elements not only includes such elements, but also includes other elements not specified expressly, or can include inherent elements of the process, method, article, or apparatus. In a case without further limitations, an element defined by the phrase "including one . . . " does not preclude the presence of additional identical elements in the process, method, article, or apparatus that includes the element.

From the description of the above embodiments, those skilled in the art can clearly understand that the method in the above embodiments can be implemented by means of software with a necessary general hardware platform, or hardware, but the former is a preferred embodiment in many cases. Based on such understanding, the essence of the technical solution of the present disclosure or the part contributing to the existing technology can be embodied in the form of a software product. The computer software product is stored in a storage medium (such as the ROM/ RAM, the magnetic disk, and the optical disk) including a number of instructions such that a terminal (which can be a mobile phone, a computer, a server, an air conditioner, a network device, or the like) executes the method in various embodiments of the present disclosure.

The embodiments of the present disclosure are described above with reference to the drawings, and only the preferred embodiments of the present disclosure are disclosed, but the present disclosure is not limited to the above specific embodiments. The above specific embodiments are only illustrative and are not restrictive, and those of ordinary skills in the art can also make equivalent changes in many forms under the inspiration of the present disclosure without departing from the gist of the present disclosure and the scope of protection of the claims, all of which are included within the protection of the present disclosure.

What is claimed is:

1. An alias processing method based on first-level data (L1D)-second level (L2) caches, comprising the following steps of:
    establishing a tag copy random access memory used for copying a tag random access memory in the L1D cache, wherein the tag random access memory and the tag copy random access memory are both composed of a plurality of data sets;
    establishing a valid array, and marking a data validity of each data set in the tag copy random access memory with the valid array;
    acquiring a check request sent by the L1D cache, wherein the check request is sent in response to the L1D cache requests data from the L2 cache; and
    checking in the tag copy random access memory based on the valid array, and determining whether the check request hits the data set in the tag copy random access memory, in response to the check request hits the data set;
    invalidating the check request in the L2 cache, and saving the check request; and
    sending a flush request with a physical address corresponding to the check request to the L1D cache, wherein the flush request is used for deleting a data set corresponding to the physical address in the L1D cache.

2. The alias processing method based on the L1D-L2 caches according to claim 1, wherein the data sets in the tag random access memory are associated into N paths, and the data sets in the tag copy random access memory are associated into 2N paths.

3. The alias processing method based on the L1D-L2 caches according to claim 1, wherein after the step of invalidating the check request in the L2 cache, and saving the check request, the alias processing method further comprises the step of:
    receiving a cache line of the corresponding physical address sent by the L1D cache, and releasing the check request to the L2 cache.

4. The alias processing method based on the L1D-L2 caches according to claim 1, wherein the alias processing method further comprises the following steps of:
    acquiring a fill request sent by the L1D cache, wherein the fill request is sent in response to the L1D cache fills data to the L2 cache; and
    based on the fill request, writing a data set with the same physical address as that of the fill request in the tag copy random access memory, and updating the valid array to mark a validity of the data set in the tag copy random access memory.

5. The alias processing method based on the L1D-L2 caches according to claim 1, wherein after the step of invalidating the check request in the L2 cache, and saving the check request, the alias processing method further comprises the step of:
    marking a data set corresponding to the physical address as invalid in the valid array.

6. An alias processing system based on L1D-L2 caches, comprising:
    a tag copy module configured to establish a tag copy random access memory, wherein the tag copy random access memory is configured to copy a tag random access memory in the L1D cache, and the tag random access memory and the tag copy random access memory are both composed of a plurality of data sets;
    a valid array module configured to establish a valid array, and marking a data validity of each data set in the tag copy random access memory with the valid array;
    a refill prestation module configured to acquire a check request sent by the L1D cache, wherein the check request is sent in response to the L1D cache requests data from the L2 cache; and
    a control unit module configured to check in the tag copy random access memory based on the valid array, and determine whether the check request hits the data set in the tag copy random access memory, in response to the check request hits the data set, the control unit module is configured to:
    invalidate the check request in the L2 cache, and saving the check request; and
    send a flush request with a physical address corresponding to the check request to the L1D cache, wherein the flush request is used for deleting a data set corresponding to the physical address in the L1D cache.

7. The alias processing system based on the L1D-L2 caches according to claim 6, wherein the control unit module is also configured to:

receive a cache line of the corresponding physical address sent by the L1D cache, and releasing the check request to the L2 cache.

8. The alias processing system based on the L1D-L2 caches according to claim 6, wherein the control unit module is also configured to:

acquire a fill request sent by the L1D cache, wherein the fill request is sent in response to the L1D cache fills data to the L2 cache; and based on the fill request, write a data set with the same physical address as that of the fill request in the tag copy random access memory, and update the valid array to mark a validity of the data set in the tag copy random access memory.

9. A computer device, comprising a memory, a processor and an alias processing program based on L1D-L2 caches stored in the memory and executed by the processor, in response to the alias processing program based on the L1D-L2 caches is executed, the processor implements the steps in the alias processing method based on the L1D-L2 caches according to claim 1.

10. A computer-readable storage medium, wherein the computer-readable storage medium stores an alias processing program based on L1D-L2 caches, and in response to the alias processing program based on the L1D-L2 caches is executed by a processor, the steps in the alias processing method based on the L1D-L2 caches according to claim 1 are implemented.

\* \* \* \* \*